Figure 1:
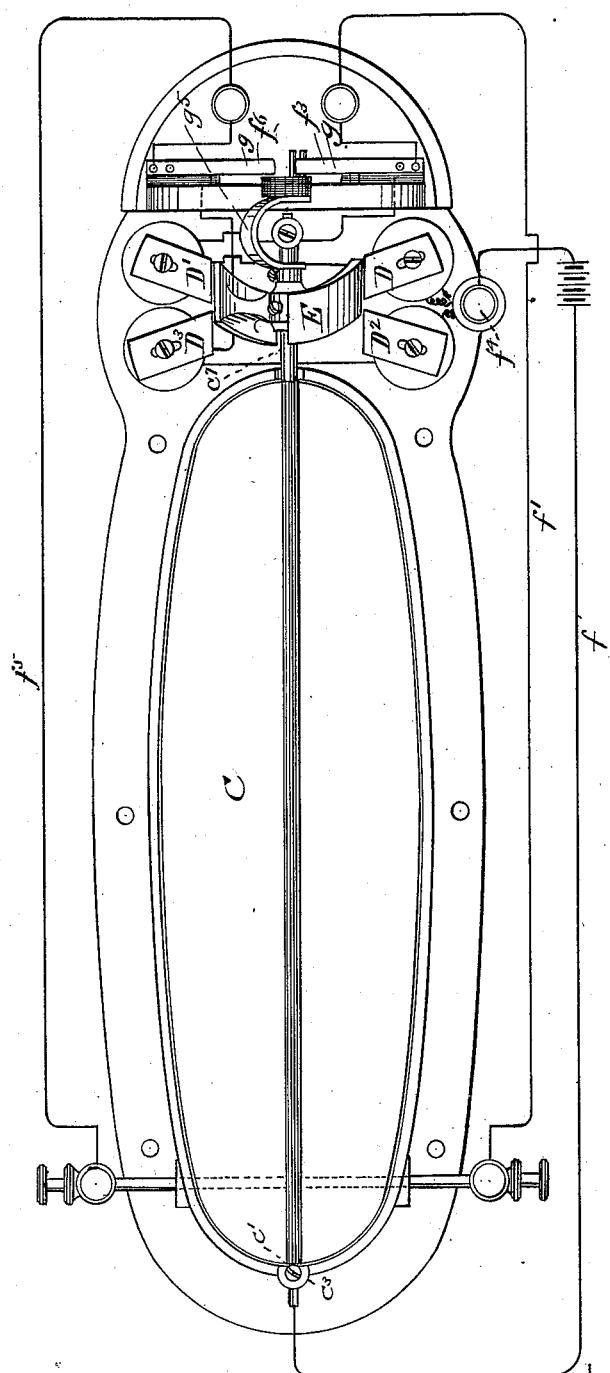

(No Model.) 3 Sheets—Sheet 1.

P. C. MORSE.
AUTOMATIC REGULATOR FOR INCUBATORS, &c.

No. 343,053. Patented June 1, 1886.

WITNESSES.
Fred. B. Dolan.
J. H. Dolan.

INVENTOR:
Parton C. Morse
by his atty
Clarke & Raymond.

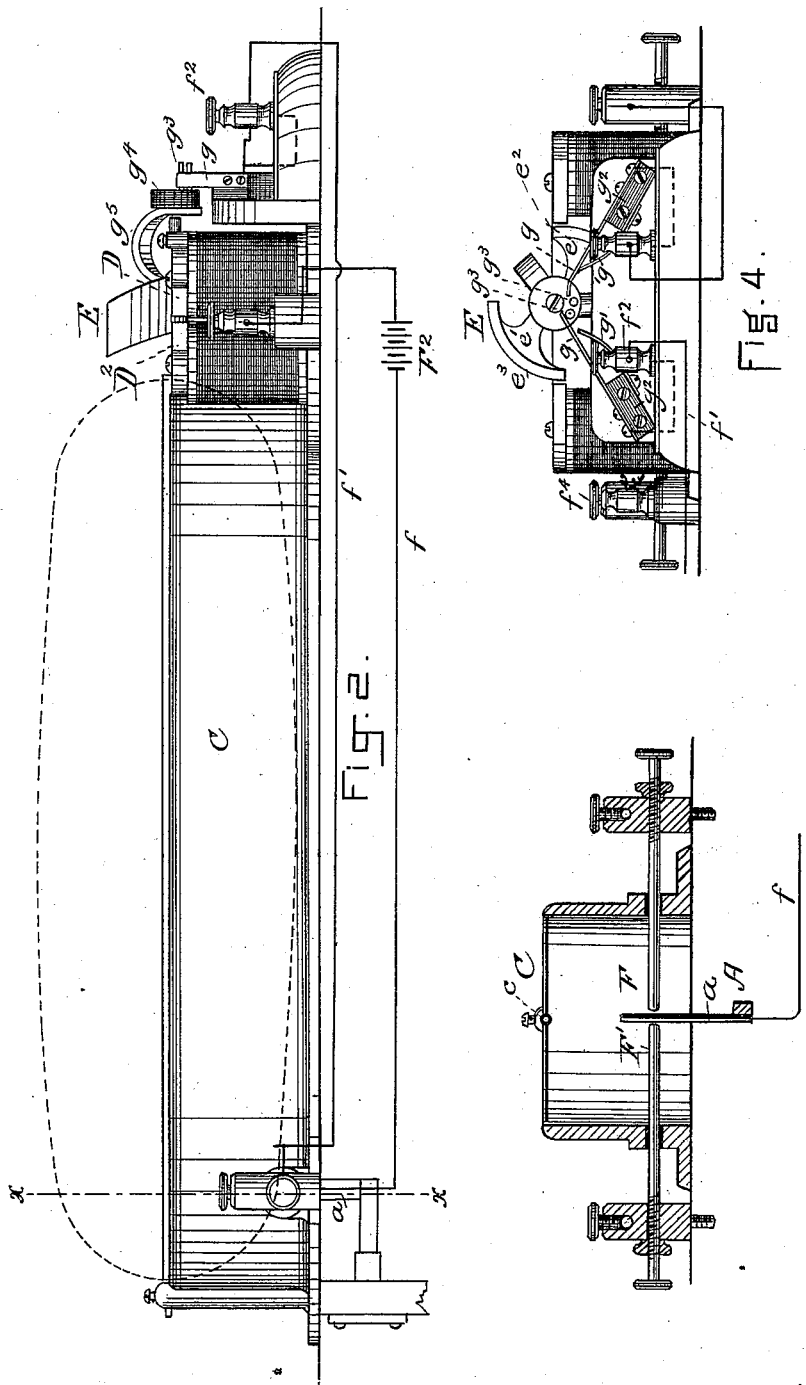

(No Model.) 3 Sheets—Sheet 3.
P. C. MORSE.
AUTOMATIC REGULATOR FOR INCUBATORS, &c.
No. 343,053. Patented June 1, 1886.
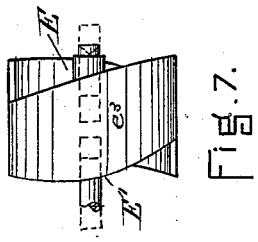
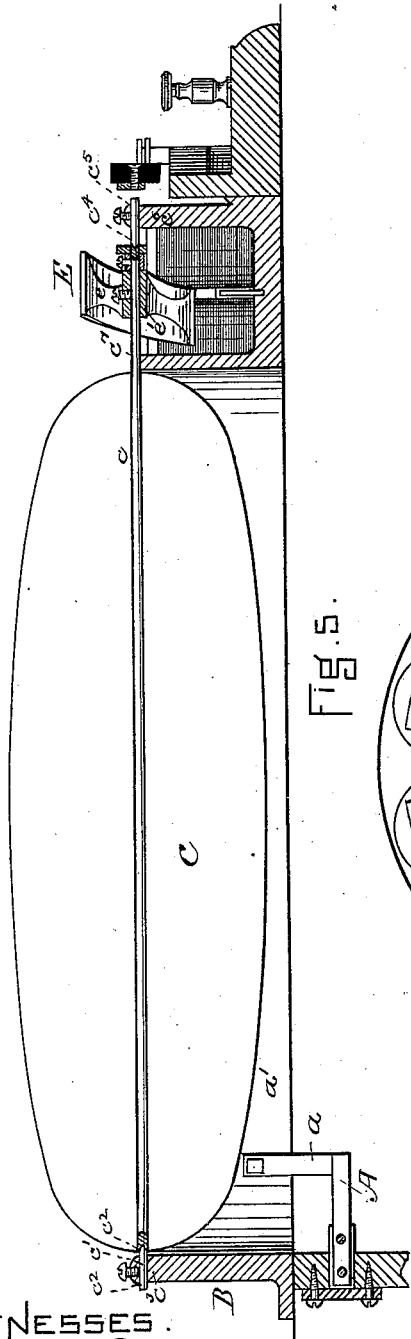
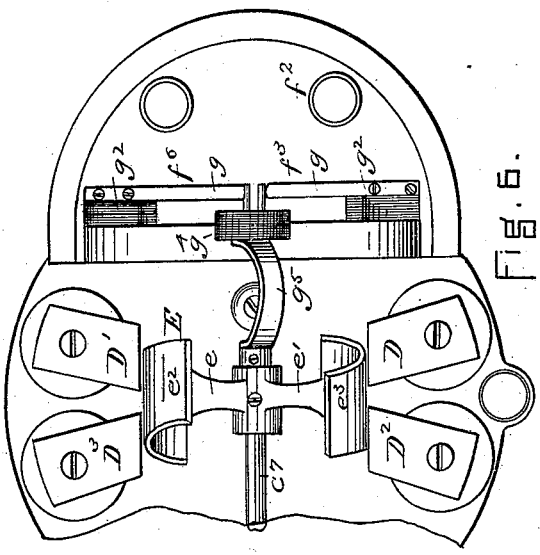
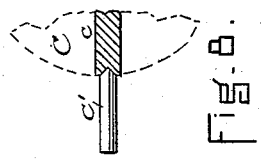
WITNESSES.
Fred. B. Dolan.
J. H. Dolan.
INVENTOR.
Preston C. Morse
by his attys
Clarke & Raymond

UNITED STATES PATENT OFFICE.

PRESTON C. MORSE, OF NATICK, MASSACHUSETTS.

AUTOMATIC REGULATOR FOR INCUBATORS, &c.

SPECIFICATION forming part of Letters Patent No. 343,053, dated June 1, 1886.

Application filed March 4, 1886. Serial No. 194,079. (No model.)

*To all whom it may concern:*

Be it known that I, PRESTON C. MORSE, of Natick, in the county of Middlesex and State of Massachusetts, a citizen of the United States, have invented a new and useful Improvement in Automatic Regulators for Incubators and other Purposes, of which the following is a full, clear, and exact description, reference being had to the accompanying drawings, forming a part of this specification, in explaining its nature.

It is very essential that the air of an incubator be maintained at substantially a uniform degree of temperature, and to provide this result it is necessary to employ a regulator very sensitive to variations in temperature; and my invention relates to an automatic regulator which will operate by a very slight variation in the temperature of the incubator, a difference of one degree or less being sufficient to actuate it.

The invention comprises a damper or valve and an electromotor of a peculiar construction connected with the damper or valve and adapted to be set in operation by a thermostat inside of the incubator.

Referring to the drawings, Figure 1 is a plan view of the damper or valve frame, the damper or valve, and devices for operating it. The damper or valve is represented as closed. Fig. 2 is a view in side elevation thereof. Fig. 3 is a vertical section upon the line $x\ x$ of Fig. 2, the damper, however, being represented as closed. Fig. 4 is a view in end elevation of the damper or valve casing and the devices for operating the damper. Fig. 5 is a view in vertical central section of the regulator, representing in elevation the parts beyond the sectional line, the damper or valve being shown as wide open. Fig. 6 is a plan view enlarged to represent the armature, magnets, and adjacent parts. Fig. 7 is a view in elevation of the armature. Fig. 8 is a detail view illustrating the manner of hanging or supporting the damper or valve.

A is a thermostat of any desired form or construction. It is arranged in the incubator, extends from one side thereof near the top, and carries or supports at its end an upward extension or arm, $a$, the upper end of which enters the opening or space $a'$ of the damper or valve casing B.

C is the damper or valve. It is of a size to close the opening or space $a'$, and it is supported by and attached to the rod $c$, which extends centrally from one end thereof to the other, and is hung on the pointed pivots or bearings $c'\ c^4$, the pivot at the end $c'$ being held in the hole $c^2$ in the stud or projection $c^3$ of the damper-casing, in which it is fastened by a set-screw. The pivot at the end $c^4$ of the rod is held in the hole $c^5$ in the post $c^6$, in which it is fastened by a set-screw. There is fastened directly to the end $c^7$ of the rod the armature E. This armature has two arms, $e\ e'$, and they each support a curved section or plate, the arm $e$ supporting a section or plate, $e^2$, and the arm $e'$ the section or plate $e^3$. These two plates are curved upon an arc of the same circle, and have the inclined edges, which are not quite parallel with each other, the vertical edges $E'$ of each plate being slightly rounded or curved so that each plate is wider at its central part than at the top. The reason for thus shaping the plates will be given hereinafter. The plates are oppositely arranged—that is, while of the same curve or circle, one takes a spiral curve in one direction and the other a spiral curve in exactly the opposite direction. The armature is arranged between the two sets or pairs of electro-magnets—namely, the damper or valve closing magnets D D' and the damper or valve opening magnets $D^2\ D^3$. The magnets are supported and arranged in relation to each other and to the armature as represented in Fig. 1 of the drawings. The closing-magnets D D', upon the establishment of the circuit, operate to move the armature in a direction to close the valve or damper, while the opening-magnets $D^2\ D^3$ operate upon the establishment of their circuit to move the armature in a reverse direction, and thereby open the damper or valve. Each plate of the armature is arranged in relation to the opening and closing magnets so that the magnets respectively exert their greatest power upon the armature during the first portion of the movement thereof, and to secure this end the plates, when the damper is either wide open or closed, project but little at their ends upon the magnets which are next to operate them. This arrangement of the magnets and armature is desirable in order that the greatest power may be utilized when the work to be done is the heaviest, and of course the starting and first moving of the damper requires more power than its subsequent movement, especially as there is used an overbalancing-weight which supplements the action of the magnets, as will hereinafter be described. Consequently the magnets and armatures are so arranged that as great power as possible shall be exerted upon the armature during the starting of the damper from its inert position, whether open or closed, and until it has been moved somewhat more than half its entire movement, when, as less power is required to finish or complete the movement of the damper, the armature is shaped so as to call for a less powerful action of the magnet, and this is obtained by providing the plates with the outward-curved edges E', as above described. The end of the thermostat or thermostat-arm $a$ is arranged between two contacting-points, F F', and it is connected with the battery F$^2$ by the circuit $f$. The contact-point F, which I call the "closing" contact-point, is connected by means of the circuit $f'$ with the coils of the closing-magnets D D'. This circuit $f'$ extends from the closing contact-point F to the binding-post $f^2$, and thence through the circuit-breaker $f^3$ to the coils, and from the coils to the binding-post $f^4$, and from the binding-post to the battery. The opening contact-point F' is connected by means of the circuit $f^5$ and circuit-breaker $f^6$ with the coils of the opening-magnets D$^2$ D$^3$, which are in turn connected with the battery through the binding-post $f^4$. Each circuit-breaker comprises two spring-plates, $g$ $g'$, which are secured to their respective blocks $g^2$, and so that the under surface of the upper arm, $g$, shall come in contact with the end of the lower arm, $g'$, except when it is held away therefrom, as hereinafter specified. The upper arms, $g$, of the two circuit-breakers extend sufficiently to come in line with the insulated pins $g^3$, which extend from the block $g^4$, attached to the outer end of a curved metal arm or piece, $g^5$, extending from the end of the damper or valve rod to which it is attached. These insulated pins $g^3$ are adapted to be brought successively, upon the movement of the damper or valve, in contact with the spring-arms $g$ of the circuit-breaker, and they operate to break the respective circuits by lifting one of the spring-arms from engagement with the other arm of the circuit—that is, when the damper or valve is closing, the spring-arm of the circuit-breaker, controlling the operation of the magnets for closing the damper, is lifted from the other arm of the circuit-breaker immediately before the damper or valve is entirely closed, while the opening-circuit, or that connecting the opening contact-point with the opening-magnets, is established by the contact of the two arms of its circuit-breaker. It will thus be seen that upon the completion of the closing of the damper or valve, or immediately before the completion thereof, the closing-circuit is broken by lifting the spring-arm of the circuit-breaker from its other arm, while the other or opening circuit is established. The damper or valve is so balanced or hung that the curved arm or piece of metal $g^5$ acts as an overbalancing-weight to hold the damper either open or closed after it has been moved by the magnets and until the thermostat establishes a circuit for again moving the damper; and in Fig. 11 I have represented the position which this overbalancing weight or arm holds in relation to the center of the damper or damper-rod when the damper is closed, and in Fig. 6 the position which it occupies when the damper is open.

In operation the thermostat is moved by the variation in temperature either in one direction or the other, according as the variation is toward an increase or a decrease, and if an increase a contact is established between the thermostat and the opening contact-point, which establishes the opening-circuit and causes the opening-magnets to operate or turn the armature in a direction to open the damper or valve, and after the contact between the thermostat and the said opening contact-point terminates upon a decrease in the temperature the damper still remains open, because it is held open by the overbalancing-weight until the temperature has decreased sufficiently to cause the thermostat to come in contact with the closing contact-point, and when this occurs the closing-magnets operate to turn the armature so as to close the damper or valve, and the damper or valve is then held closed by the overbalancing-weight until the temperature again increases sufficiently to bring the thermostat in contact with the opening contact-point. Immediately before the completion of the opening or closing of the damper the circuit which causes the operation of the opening or closing magnets is broken, so that when the damper is entirely closed or wide open, even if the thermostat remains in contact with the contact-point, the circuit is broken and the armature is in a position to be immediately moved by the other circuit, the circuit-breaker of which is closed. It will be seen that this organization is very sensitive and very direct in its action, and also that the construction is very simple, the armature being applied directly to the rod carrying the damper or valve and turning with it.

Of course it is obvious that this device can be used for other purposes than those herein indicated, or wherever it is necessary to operate a valve or damper.

Having thus fully described my invention, I claim and desire to secure by Letters Patent of the United States—

1. In an electro air-regulator, the combination of a damper or valve having an armature provided with arms $e$ $e'$, spirally curved in opposite directions, a thermostat connected with a battery, two circuits, one of which has an opening contact-point, and the other of which has a closing contact-point arranged in relation to the thermostat, as described, and two pairs of electro-magnets, D D' and D² D³, arranged so that the magnets D D² are opposite the magnets D' D³, substantially as set forth.

2. The combination, in an electric air-regulator, of a valve or damper, an armature attached directly to a rod carrying or supporting the valve or damper, having arms $e$ $e'$, curved spirally in opposite directions, and two pairs of electro-magnets, D D' and D² D³, the magnets D D² being upon one side of the armature and the magnets D' D³ upon the other, and adapted to operate in connection therewith, substantially as set forth.

3. The combination, in an electro air-regulator, of a damper or valve, an armature, and electro-magnets for it, and an overbalance or weight for moving the damper or valve and for holding it open or closed after the circuits have been broken, substantially as described.

4. The combination, in an electro air-regulator, of a damper or valve, an armature, and the electro-magnets for turning it, and circuit-breakers arranged to be operated upon the movement of the armature or damper or valve, substantially as specified.

5. The combination, in an electro air-regulator, of a damper or valve, an armature connected therewith, electro-magnets D D² upon one side of the armature, and electro-magnets D' D³ upon the other side of the armature, a thermostat, an opening and a closing circuit, an opening circuit-breaker and a closing circuit-breaker, insulated pins for operating the circuit-breakers, and an overbalancing weight or arm, substantially as described.

PRESTON C. MORSE.

Witnesses:
F. F. RAYMOND, 2d,
FRED. B. DOLAN.